(12) United States Patent
Derman

(10) Patent No.: US 6,524,010 B1
(45) Date of Patent: Feb. 25, 2003

(54) ROLLING BEARING

(75) Inventor: Karl Gustaf Derman, Karna (SE)

(73) Assignee: AB Agora, Skelleftea (SE)

( * ) Notice: Subject to any disclaimer, the term of this patent is extended or adjusted under 35 U.S.C. 154(b) by 0 days.

(21) Appl. No.: 09/830,586

(22) PCT Filed: Nov. 4, 1999

(86) PCT No.: PCT/SE99/01985
§ 371 (c)(1),
(2), (4) Date: May 9, 2001

(87) PCT Pub. No.: WO00/31426
PCT Pub. Date: Jun. 2, 2000

(30) Foreign Application Priority Data

Nov. 20, 1998 (SE) ................................................ 9803969

(51) Int. Cl.⁷ ............................. F16C 1/06; F16C 33/61
(52) U.S. Cl. ...................................... 384/513; 74/502.3
(58) Field of Search ............................... 384/492, 499, 384/502, 504, 505, 506, 507, 510, 512, 513, 516, 535, 566, 301; 74/502.3

(56) References Cited

U.S. PATENT DOCUMENTS 3,304,138 A * 2/1967 Sampatacos ................. 384/516
3,344,682 A * 10/1967 Bratz ........................ 74/502.3
3,990,321 A * 11/1976 Hurlow ..................... 74/502.3
4,509,871 A * 4/1985 Herzog et al. ............... 384/502

FOREIGN PATENT DOCUMENTS

SE 47023 4/1919
SE 47558 4/1919

* cited by examiner

Primary Examiner—Thomas R. Hannon
(74) Attorney, Agent, or Firm—Dennison, Schultz & Dougherty

(57) ABSTRACT

A rolling bearing for journalling an outer machine component (12) for rotary movements in relation to an inner machine component (13). For connection to at least one of the machine components, the bearing comprises corresponding outer and inner main elements, respectively, in the shape of a helical spring (14/15), which is wound to form parts (16/22) supporting rolling surfaces for the rolling bodies (17) of the bearing, which rolling bodies are arranged in an annular raceway. The spring is wound from said supporting part so that it forms a connection part (19/24) in at least one axial direction. These connection parts are arranged to connect and join with further operative parts of the bearing. Examples include parts for connecting the supporting part in question for said rolling surface with further such parts to form a bearing with several rows. Further functions can be to form one or several parts for the assembly and attachment of the helical spring to the respective machine component (12, 13), such as a seat in the outer machine component or an outer envelope for a shaft belonging to the inner machine component.

7 Claims, 3 Drawing Sheets

ROLLING BEARING

TECHNICAL FIELD

The present invention relates to a rolling bearing arranged to be connected to other machine components to journal the same during rotation and comprising a number of rolling bodies arranged to roll in an annular raceway around a centre of rotation for the bearing, an outer main element in the form of a ring or tube outside said annular raceway with a rolling surface for the rolling bodies that faces substantially inwards towards the centre of rotation in said annular raceway, and an inner main element with a rolling surface for the rolling bodies that faces substantially outwards away from the centre of rotation in said annular raceway.

BACKGROUND ART

Rolling bearings of the type specified above for journalling machine components for rotary motion are categorized with respect to the design of the rolling bodies into ball bearings, roller bearings and needle bearings. The two first-mentioned types, in particular, are found in many different sizes and designs for more or less heavy loads and for different sorts of load. Examples include grooved ball bearings, angular contact ball bearings and self-aligning bearings.

One category of bearings on the market is bearings of a standard design, "catalogue products", which have a cylindrical outer envelope and a cylindrical shaft hole. The utility of such bearings is in essence limited to their function as bearings; and the machine parts to be journalled to each other must be adapted by machining before connection to the outer envelope or shaft hole, respectively, of the bearing.

Another category of rolling bearings is bearings that, in addition to their utility as bearings, are adapted to be connected to a specific machine part. A typical example is bearings for front wheels for bicycles. In such a bearing, one part is in the form of a hub spindle, inside the ends of which raceways are arranged for the rolling bodies, which are balls, of the bearing. The opposite inner raceways are designed as discs with a threaded hole, which is designed so that the two discs can be threaded on a mounting axle for the wheel with the hub spindle therebetween. The hub spindle is provided with external flanges with holes for fastening the spokes of the wheel. Such a bearing is thus designed as a complete hub assembly, adapted to be attached with the axle in the fork for the wheel and forming a mounting unit for the spokes. Products within this category are in the following denoted as "designated bearings". These are most commonly made as bulk products and can be widely used within a certain product group.

Finally, mention is made of a category that can be termed "integrated bearings". The bearing is there integrated into a larger construction complex, in which the machine components are designed for other functions besides a bearing function. An example that can be mentioned is hub assemblies for vehicle wheels, which are often referred to as "hub units" in the motor industry. Hub assemblies are there designed for a specific vehicle model and comprise, in addition to the operative components necessary for the bearing, an outer hub component for attaching the wheel and an inner hub component with devices for wheel suspension and drive members, for instance.

In all the mentioned categories of rolling bearings, it is common that the rolling surfaces are designed as ground raceways adapted to the shape of the rolling bodies. These raceways must be finished with great precision and high-tensile steel must be used in the main elements where the raceways are fashioned. The material as well as the machining costs for such designs result in relatively high prices for rolling bearings manufactured in this way. Attempts have therefore been made to fashion the raceways in another way. A known method is to line the raceways with thin sleeves of high-tensile steel. In this way, it is not necessary to use such high-quality materials throughout the entire bearing assembly, whilst it is possible to make the quality of the materials in the thin sleeve very high by compression and choice of extremely durable materials. In the patent specification DE, A, 384914 (Thalheimer) it is suggested that such a lining is made out of a helically wound wire, which is shown to be laminating-rolled and ground to form the support for the rollers in a rolling bearing. Another suggestion is known from the patent specification DE, A, 846 646 (Franke), in which the raceways are formed by annular wire rings abutting the rolling bodies, in the form of balls. By these means, the machining of the main components of the bearing that are rotatable relative to each other is considerably reduced, from the grinding of entire raceways to the cutting of grooves in which the wire rings can be fixed. The wire rings can be made of compressed high-tensile steel as a support for the rolling bodies. In this way, it is possible to compensate, to some extent, for the reduced contact surface between main component and rolling body as compared with ground raceways.

Using the standard rolling bearing with its cylindrical outer envelope and cylindrical hole as well as ground raceways as an archetypal design for rolling bearings, one can, in elucidating what has here been stated, identify certain development trends in the known art. One of these is represented by the categories mentioned as designated bearings and integrated bearings. In these categories certain further functions, besides the pure bearing function, have been accommodated, which is not the case with standard bearings. The other development trend described herein is the evolution of methods of forming the raceways of the bearing other than grinding the rolling surfaces into the main components of the bearing. This development is the one most germane to efficiency improvement and the reduction of manufacturing costs and greater freedom of choice in materials. This development trend may be relevant to standard bearings, as well as designated bearings and integrated bearing assemblies.

THE PURPOSE OF THE INVENTION

The purpose of the invention is to provide a design for the main elements of the bearing, such that it can be manufactured, even in small runs, in an efficient and cost-effective way, and which provides plentiful opportunities for the design of designated roller bearings and integrated bearings with additional functions besides the pure bearing function. In this way, assemblies comprising bearings for rotary motion can be manufactured at a lower cost than is possible using standard rolling bearings for the bearing function. The invention is primarily intended to be utilized in connection with assemblies for light-duty service.

THE ESSENTIAL CHARACTERISTICS OF THE INVENTION

In the device in accordance with the invention, one or both of the main elements of the bearing is formed by winding a helical spring in such a way as to form the raceway of the rolling bodies, but the spring is also fashioned to form parts with a function other than the bearing function by extending the spring by further turns of winding in one or both axial directions from the part of the spring forming the raceway. In this way, additional functions, such as the connection to further raceways in rolling bearings with several rows, the fashioning of connection and attachment elements for fastening to the journalled machine structure, or the elastic suspension of the journalled unit can be accommodated at an insignificant extra cost over and above the cost of the winding for the raceway.

DESCRIPTION OF DRAWINGS

A number of embodiments of the invention will be described in the following with reference to the accompanying drawings, in which.

PREFERRED EMBODIMENTS

Figure 1:
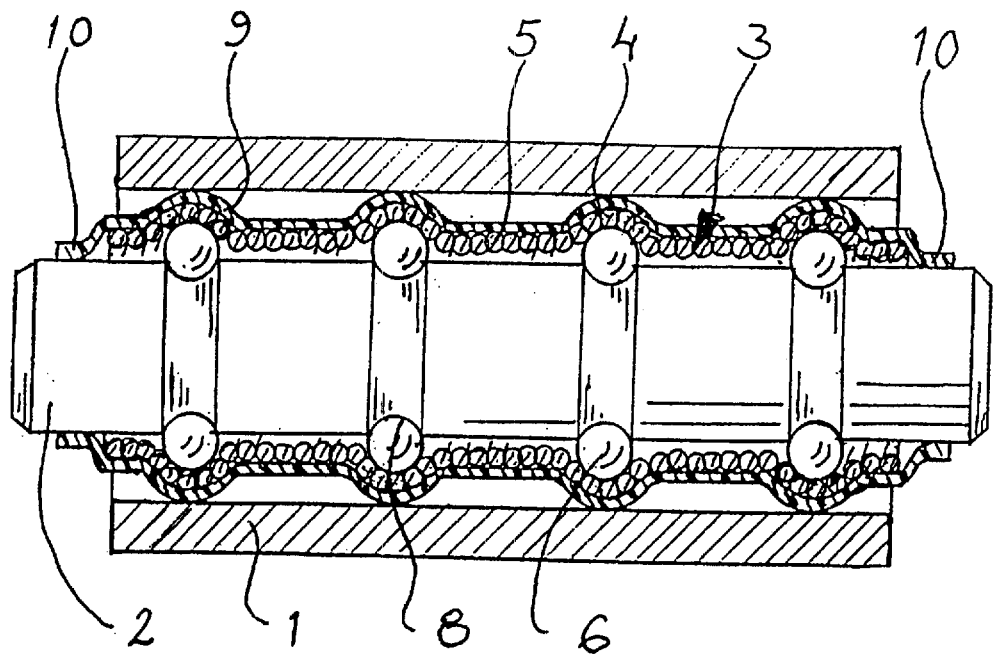
FIG. 1 is a sectional drawing of a ball bearing, fashioned in accordance with the invention, with several rows.

Illustrated in the drawings and described in the following are parts of the machine structure, the components of which are to be journalled to each other for rotary motion by means of the rolling bearing in accordance with the invention. In this context, the two components of the machine structure are divided into an "outer component" and "inner component", which can also be termed the "shaft component". One of these components is connected to a larger complex, such as a stand, a vehicle body or the like, whilst the other component can be denoted as the rotatable or pivotable component. The fixed component can be either the outer component or the inner component, the shaft component. A wheel, for instance, can have a co-rotating axle, journalled in a wheel fork, thereby representing the fixed component. Alternatively, the wheel can be provided with the outer component and be journalled on an axle fixedly attached to a greater structural part.

FIG. 1 shows a ball bearing with several rows. The outer component of the machine structure is here shown as a sleeve 1 and its inner component as a shaft 2. The sleeve 1 can carry a wheel or other component for rotation and the shaft is fixedly mounted on one or both sides. Alternatively, the shaft can carry one or several rotatable elements and the sleeve 1 is then fixedly mounted. The outer main element of the bearing is formed by a helical spring 3, which is wound so that it forms a number (four are shown here) of outwardly deflected parts 4 with interjacent cylindrical parts 5. The parts 4 form raceways for the rolling bodies 6 placed in an annular track. Balls are shown here, but rollers can be used as an alternative, in which case the outwardly deflected parts 4 are fashioned with level raceways, laterally finished with inwardly deflected winding turns of the wire, meeting the corresponding parts 5 and forming parts for retaining the rolls in positions.

As illustrated, the outer element is formed by the helical spring 3. It has the two main functions of forming the raceways for the rolling bodies and of forming the supporting parts, dimensioned to absorb the load of the rolling bodies without any separate transjacent support being required. The spring also fulfils another function, namely by way of the parts 5 forming connection and joining parts, so that it becomes possible to have several raceways in the same main element by adapting the diameter of its winding turns to the intended function of the part in question. The spring thus forms not only the raceway of the main element but extends at one or both sides of the same by further winding turns in the axial direction, forming said part 5 for connecting several raceways after each other, in the embodiment in accordance with FIG. 1.

The shaft 2 is cylindrical and is provided with grooves adapted to the contour of the rolling bodies 6 to form inner raceways for the annular tracks of the rolling bodies. In connection with a roller bearing, instead of the shown rounded groove track, the shaft can have level groove tracks, thereby fixing the shaft in the axial direction relative to the outer component 1 by means of the edges of the grooves. Should this fixation be undesired, the shaft in the roller bearing can be level. If, on the other hand, the rollers are axially fixed by means of the groove edges in the shaft, said inwardly turned parts of the spring 3 can be omitted, in which case the outer component 1 will nevertheless need to be axially fixed in some other way. However, the shown axial guiding of the rolling bodies in the outer component as well as the inner component should provide the most versatile design.

Threaded over the spring 3, is a shrinkage hose 9, which on both sides is shown extending beyond the outermost raceways for the rolling bodies. The plastic material in such a hose is stretched and retains this stretched dimension at room temperature. Such a hose can therefore be dimensioned so that it can be threaded over the spring. If its temperature is raised, it will shrink since the material strives to resume a "resting position". As illustrated in FIG. 1, the hose will then bear against the outer envelope of the spring, following its contours. It is shown that, beyond the outermost raceways for the rolling bodies, the hose has shrunk so much that it contacts the shaft 2 with its terminal parts 10. By these means, shaft seals are formed, preventing dirt and damp from entering into the raceways with the rolling bodies and also preventing lubrication from escaping from the inside of the bearing.

When making the bearing in the embodiment shown in FIG. 1, the shaft 2 and the spring 3 are first manufactured. Thereafter, the finished rolling bodies 6 are mounted by placing the shaft in the spring, whereupon the same is pulled out at its respective outwardly deflected parts 4, the parts where the rolling bodies are to be placed, whereupon these in turn can be placed to contact the respective grooves 8 in the shaft 2. The raceways for the rolling bodies can be filled leaving only a small space between the rolling bodies. In this way, holders for the rolling bodies can be omitted, such holders otherwise being necessary if there are larger interspaces between the rolling bodies. Thus, despite it being possible to provide the raceways with guiding edges, the raceways can be equipped with a full complement of rolling bodies and do not need to be provided with holders, which is not possible in respect of bearings with their main components fashioned as homogenous rings with uninterrupted track edges. When all the rolling bodies have been mounted, the shrinkage hose 9 is threaded over the spring and subjected to such increased temperature that it shrinks to the shape shown in the drawing. Thereafter, the bearing unit is inserted into the outer component, the sleeve 1, which is slightly under dimensioned, so that the sleeve forms a friction joint with the sleeve. As the hose renders the spring assembly airtight, further fixing and sealing of the bearing can be achieved by spreading sealing compound or adhesive around the shrinkage hose inside the sleeve.

As will become apparent from the following description of further embodiments, the parts extending from their respective raceways fulfil the function of connecting the main element to the machine parts that are journalled to each other.

Figure 2:
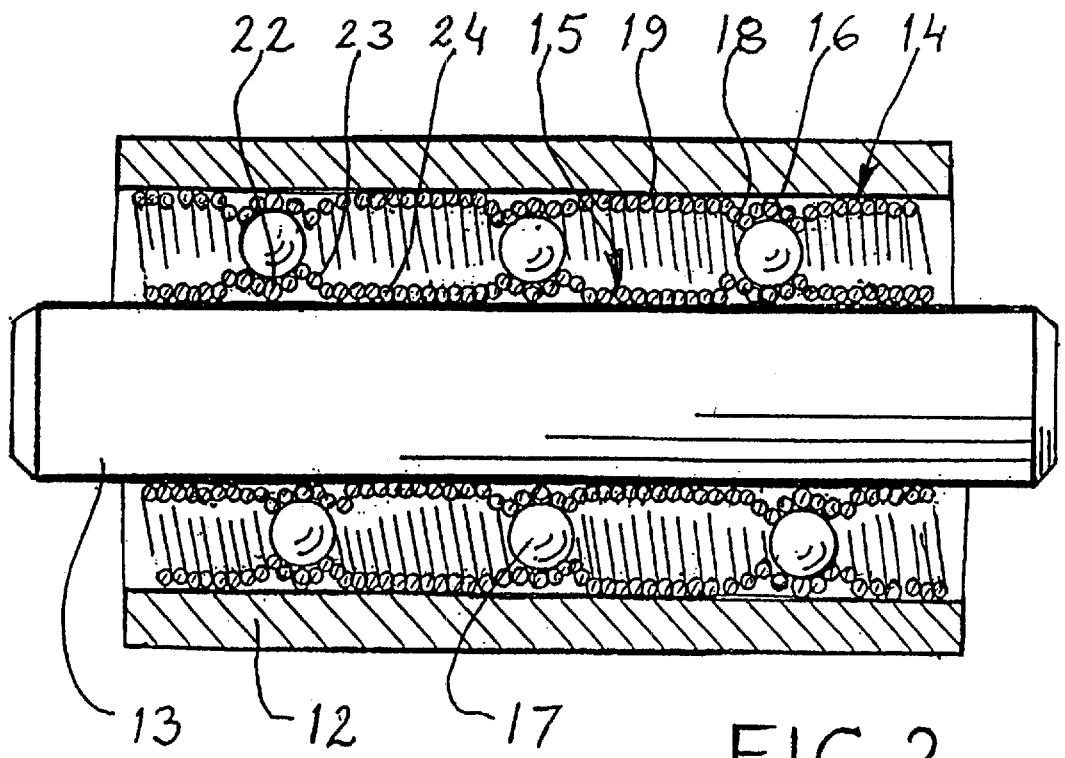
FIG. 2 is a sectional drawing of a different embodiment of a ball bearing with several rows.

FIG. 2 shows a ball bearing with several rows. It is constructed in such a way that spring elements fashioned in accordance with the invention are used to form both the outer and the inner raceways. The springs are wound to form outer and inner contact surfaces, respectively, to be fitted directly against an outer machine component with a smooth hole and against a smooth shaft, respectively. In FIG. 2 the outer component of the machine assembly with said smooth hole is designated 12 and the smooth shaft 13. The outer spring is designated 14 and the inner one 15. The spring 14 features outwardly deflected parts 16, which in the manner previously described form raceways for the rolling bodies, here designated 17. Between the parts 16, connection and joining parts 18 extend, initially outwards from the terminal winding turns of the parts 16 and further out to form cylindrical parts 19. Thus, these parts form a cylindrical, uninterrupted outer envelope, adapted to be inserted into the hole of the outer machine component 12.

The inner spring 15 is designed in a corresponding way, here with inwardly deflected parts 22 forming raceways and, extending from the edges of the same, connection parts 23, which are further inwardly deflected to form inner parts 24. Together, they form a cylindrical inner envelope, the inner diameter of which is adapted so that the smooth shaft 13 can be inserted into it.

The parts can most suitably be assembled if the shaft 13 is inserted into the inner spring 15. Thereafter, the outer spring 14 is pulled over the inner spring and the rolling bodies positioned by pulling out the outer spring, as previously described. Finally, the entire unit is inserted into the hole of the outer component 12.

This design enables the connecting machine components to be fashioned in a very simple way. The outer component can quite simply be manufactured by cutting a tube and the inner one by cutting a rod material. In its most uncomplicated design, described here, the bearing is completely unsealed. It can be enhanced with sealing, however, with the aid of a shrinkage hose, as shown in FIG. 1. Alternatively, the shaft or the hole of the outer component can be provided with packings of a conventional type, such as sleeve packings or O-rings.

Figure 3:
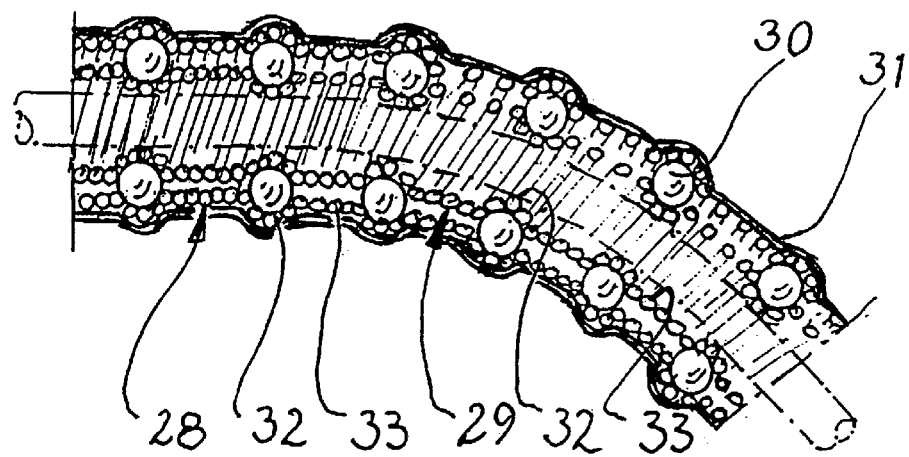
FIG. 3 is a sectional drawing of a ball bearing with several rows in a flexible design for journalling flexible rotating shafts, for instance.

The embodiment shown in FIG. 3 illustrates how a design essentially corresponding to the design in FIG. 2 can be used for journalling flexible, rotating shafts. An outer spring 28 has substantially the same design as the spring 3 in accordance with FIG. 1 and an inner spring 29 is shown having substantially the same design as the inner spring 15 in accordance with FIG. 2. The parts forming raceways are designated 32 and the connection parts 33, in respect of the inner as well as the outer main elements 28 and 29. The rolling bodies are designated 30.

The outer spring 28 is shown provided with a shrinkage hose 31, which lends greater stability to the bearing. It is intended, however, that the bearing shall be able to be inflected to adapt to the inflection of the rotating shaft. This can be made more difficult if the spring is provided with a shrinkage hose. If the inflection of the shaft at a certain point can be predicted before assembly, the bearing can be inflected to the corresponding shape and thereafter fixed by means of shrinking the hose onto it.

This can potentially be used with two different types of flexible shafts. In the one type, the shaft performs a rotary motion, driven by a fixedly mounted motor for a hand tool, for instance. The shaft is then journalled in an outer sleeve and the entire assembly must be freely flexible during operation. The illustrated bearing can be inserted into the outer sleeve to journal the shaft along it entire extension or in certain sections. Alternatively, the bearing can be fastened to the shaft and the sleeve be positioned afterwards. It is common for flexible shafts to be designed in the shape of tightly wound, long helical springs. In the invention, it is possible to allow the inner spring 29 of the bearing, which spring is wound to form the raceways, to also form the power-transmitting, flexible shaft.

The other type of flexible shaft has a fixed mounting and is commonly used for remote control of some organ. The shaft is then given an extension adapted to the circumstances of installation of the control shaft. The shaft may have to be inflected in different places and in such places exceptionally high levels of stress arise, which are suitably absorbed by rolling bearings. The bearing in accordance with FIG. 3 is particularly suitable for this purpose. It can be manufactured as "piece goods" and can easily be cut to the required length for different products and installations.

Figure 4:
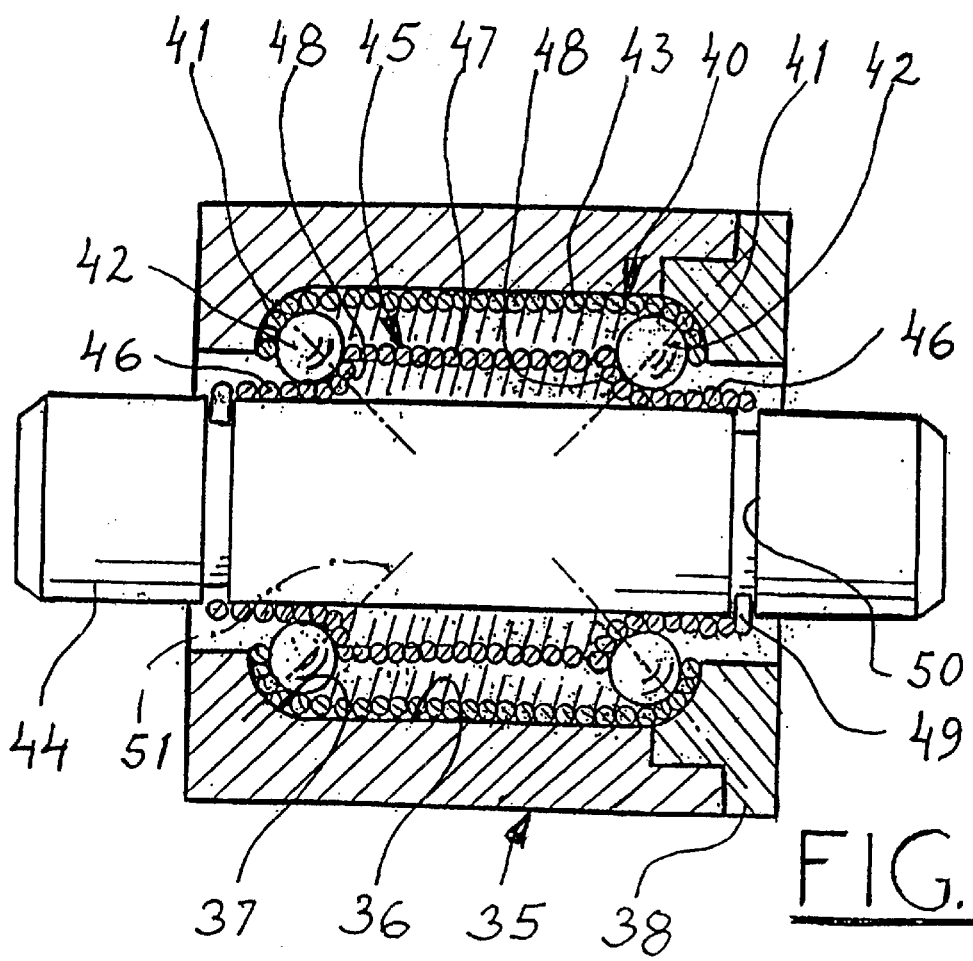
FIG. 4 is a sectional drawing of an angular contact ball bearing with a spring fashioned for a locking function.

FIG. 4 shows an embodiment in accordance with the invention as an angular contact ball bearing. The rolling bodies therein, in two annular tracks, contact raceways, the contact centres of which are mutually reversedly inclined in relation to the axis of rotation. In this way, with a single bearing, an absorption of the load is provided that is particularly beneficial against forces striving to incline the shaft.

In FIG. 4, the outer component of the machine assembly is shown as a hub 35 with a seat 36 for the outer main element of the bearing and finished with a bottom part 37. On the opposite side, the seat can be closed with a cover 38. The outer main component of the bearing is designated 40 and consists of a spring with inwardly deflected terminal parts 41, which are formed to contact rolling bodies 42, shown as a ball, essentially over a quadrant of the surface of the ball at an angle of approximately 45° to the rotational centre of the inner component of the machine assembly, a shaft 44. Winding turns of spring extend between the spring parts 41 forming the rolling surfaces, to provide a connection and joining part 43. The seat 36 is adapted to support the spring 40 and both sides by means of the bottom 37 and the cover 38, respectively, and to contact the part 43.

The inner main component of the bearing is formed by a spring 45. It has terminal, cylindrical connection parts 46, adapted to be threaded over the shaft 44. An outwardly deflected connection part 47 extends between the contact parts 48 for the balls 42 at each end of the spring. These are positioned opposite the contact parts 41 in the outer spring 40. Thus, the balls 42 obtain said angled contact, which is illustrated by the dot-and-dash lines 51 extending through the respective centres of the contact raceways at an angle to the shaft.

The outer, cylindrical parts of the inner spring 45 terminate in inwardly turned terminal parts 49 of the wire, out of which the spring is formed by winding. These are adapted to be snapped into grooves 50 in the shaft. By these means, the inner spring 45 is fixed axially in relation to the shaft, which in turn is fixed in relation to the outer component 35 by the fixing of the outer spring in the seat 36. The axial fixing by means of the clasp parts 49 and the grooves 50 can also be utilized in circumstances other than the one shown. The outer spring can likewise be correspondingly fixed in grooves in a trough-running seat.

Figure 5:
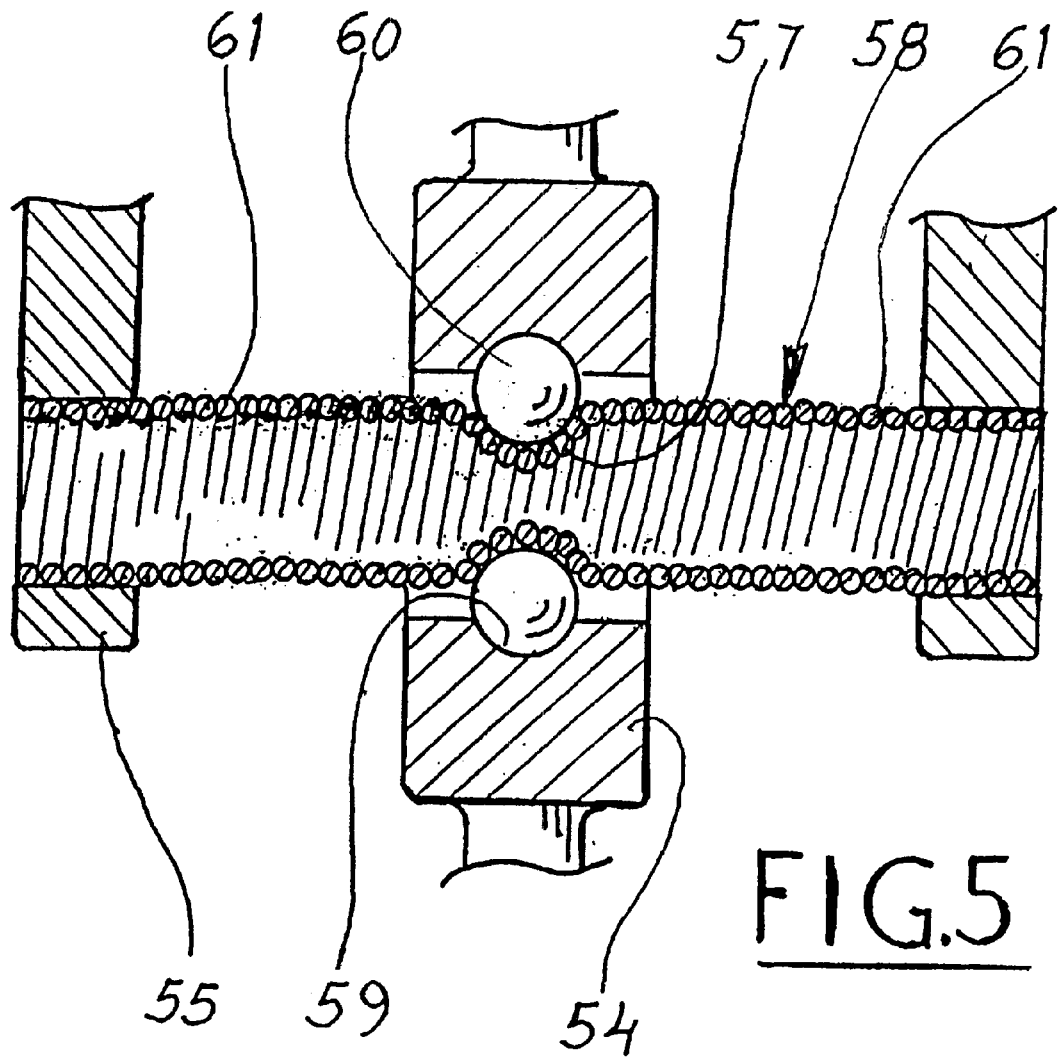
FIG. 5 is a sectional drawing of a bearing with elastic suspension.

FIG. 5 shows how a spring, forming a bearing raceway, can be utilized for elastic suspension. This presumes that a wheel 54 is journalled in a fork 55 with two fork legs. The bearing is shown here in a very simple design with a raceway 57 in a spring 58, forming the inner main component of the bearing. The outer main component of the bearing consists of the wheel 54, in which a groove 59 has been made, forming the outer raceway. Rolling bodies in the form of balls 60 are positioned between the part 57 of the spring and the groove 59. These can be mounted by using the spring capacity of the spring. The spring extends from the raceways 57 for the balls 60 further on both sides with connection parts 61 of a certain length. The ends of these parts are attached to the fork 55. This can be achieved by insertion into holes in the fork legs or by means of a hasp. Alternatively, the manifold possibilities for freely shaping the spring can be exploited. For instance, fixing clasp parts, similar to the ones shown in FIG. 4, can be used or the spring can be fashioned with loops at the ends that can be suspended simply from hooks or the like on the fork legs, the spring suitably being extended somewhat to contact the attachment sites.

The embodiment in accordance with FIG. 5 thus provides journalling as well as elastic suspension for a wheel by means of a single element, the spring 58 in accordance with the invention. Such an elastic suspension does not have to be carried out for double-sided attachment of the spring. Alternatively, the spring can be terminated in one of the directions after the raceway and the end having an extended part corresponding to the part 61 can be fastened in a sturdy way in an attachment for single-sided suspension. This method of achieving journalling as well as elastic suspension in a simple way by means of a single element can be employed in various bearing designs, such as ones in accordance with FIG. 1 and FIG. 2, for instance, and with the outer main element of the bearing also designed in the shape of a spring.

The spring resistance can be adjusted through the rigidity of the spring by adapting length, diameter and wire thickness. Further rigidity or reduction of the spring force can be attained by positioning a damping element or by shrinking a hose on it.

The embodiments shown and described are only examples of the principles of the invention, namely that a helical spring forms the raceway for the rolling bodies of the rolling bearing as well as further parts for functions that are not linked to the bearing function, it having been mentioned how the spring can be employed to connect a row of raceways, to attach and connect to journalled machine components, and to provide elastic suspension. Beyond this, the possibilities of using the principle of the invention to create designated rolling bearings and integrated bearing assemblies for products of all kinds are multitudinous. Other design details, not described in the preceding, can also be fashioned.

It is postulated that the raceways are formed of a tightly wound wire of a dimension that renders the spring able to absorb the load from the rolling bodies. A different winding of the spring can also occur in respect of the connection and joining parts. To reduce the amount of wire needed and/or to incorporate the possibility of adjustment to the axial dimensions of the spring element, the connection and joining parts can be fashioned with loose wire turns. With modern winding techniques, it is also possible to achieve deviations from the cylindrical form in said parts, besides conical shape, also non-annular shape if such is advantageous for the adaptation and connection of the main element to the extant machine components.

The quality of the winding wire can also be employed for adaptation to different installation circumstances. The original material of the wire is obviously important. Stainless steel, for instance, can be used. During wire drawing, the hardness of the material can be affected by the resulting compression. The hardness can also be affected by hardening of the spring after winding.

If, for instance, raceways with greater contact surfaces than are obtained with a round wire in the spring are desired, the wire can be ground when it has been wound to an initial shape. It is even possible to use wire with quadrangular or flat cross section to create raceways with greater contact surfaces than are obtained with round wire.

A helical spring has the characteristic that if it is twisted in one direction the diameter will diminish, whereas if it is twisted in the other direction the diameter will increase. This provides the possibility of attaching the spring by means of it being slotted into an under dimensioned hole or over an overdimensioned pin by being twisted in the one or the other direction, respectively, when it is being attached. When the twisting ceases, the spring will lock itself into the hole by expanding or onto the pin by contraction, respectively.

As has been mentioned above, the spring properties of the spring can be exploited during assembly. An example mentioned is the mounting of the rolling bodies by the spring being pulled out so much near the raceways that the rolling bodies, primarily balls, can be positioned between the winding turns of the spring. In this way, the row of rolling bodies can be filled to such an extent that a holder to space the rolling bodies from each other is rendered unnecessary. Moreover, the spring properties provide advantageous possibilities during the assembly of the complete bearing to the machine components in question. For an example of this that has already been mentioned, see the preceding paragraph and the locking parts in the embodiment in accordance with FIG. 4.

The invention is particularly advantageous in that, with modern, numerically controlled technology, even very complicated forms can be bestowed on springs during winding in an automated process. As this is achieved by means of numerical controls without the need for special tools for each shape, the appearance of the spring can be adapted to the needs of the situation without high conversion costs. In this way, the invention is suitable to be used even with very small runs of designated bearings. Generally speaking, the principle of the invention is best suited for bearings for light-duty service and, in addition, equipment for more temporary use.

The nuclear idea of the invention is thus that a helical spring, adapted to a pre-determined shape during its winding, is employed as one or both of the main elements and constitutes the substructure and the load-absorbing component of the same. Additionally, the spring is wound with parts outside its raceway, so that parts for further functions, besides forming the raceway, are provided. The spring is thus fashioned as a body with several integrated functions.

I claim:

1. A rolling bearing comprising two bodies (14 and 15) arranged coaxially, one outside the other, wherein the two bodies have two opposing surfaces between which are arranged a number of rotating units (17) such as balls or rollers, and wherein said opposing surfaces are grooved so that the units remain in the grooved parts of the two opposing surfaces of the two bodies, characterized in that at least one (3) of the bodies is in the form of a helical spring in the nature of a sleeve and so wound as to produce a groove section (4), the helical spring being dimensioned to absorb the forces from the units, and in that it can be subjected to axial forces so that rotating units (6) can be supplied to the helical spring between two winding turns.

2. A rolling bearing as claimed in claim 1, characterized in that the outer surface of each body (14, 15, respectively) consisting of a helical spring is provided with a protective covering (9).

3. A rolling bearing as claimed in claim 1, characterized in that each helical spring (14, 15, respectively) has an extention towards one or both sides of the journalling point formed by said units (6).

4. A rolling bearing as claimed in claim 3, characterized in that each helical spring (14, 15, respectively) may be so fitted that one or more consecutive grooved sections (16) are formed.

5. A rolling bearing as claimed in claim 1, characterized in that each body (14, 3, respectively) in the nature of a helical spring cooperates with a solid body (13).

6. A rolling bearing as claimed in claim 1, wherein both bodies (14 and 15) consist of helical springs of optional length, characterized in that the helical springs (14 and 15) are provided with a number of grooved sections (16), giving rise to a number of consecutive rolling bearings, wherein the journalling units are tubular journalling shaft for a flexible axis.

7. A rolling bearing as claimed in claim 1, characterized in that the body (61) situated within consists of a helical spring with grooved exterior (57) and the body (54) situated outside is solid, and in that the body (61) situated within protrudes from the bearing, the protruding parts being secured in suitable members.

* * * * *